United States Patent [19]
Wilhelm, Jr. et al.

[11] Patent Number: 4,816,730
[45] Date of Patent: Mar. 28, 1989

[54] AUTOSAMPLER

[75] Inventors: Robert E. Wilhelm, Jr., Wilmington; John R. Reader, Jr., Newark; Kenneth W. Gormley, Sr., Mantua; Kendall B. Hendrick, Wilmington; Richard J. Celeste, Newark, all of Del.

[73] Assignee: E. I. Du Pont de Nemours and Company, Wilmington, Del.

[21] Appl. No.: 944,749

[22] Filed: Dec. 22, 1986

[51] Int. Cl.⁴ .............................................. G05B 19/42
[52] U.S. Cl. ...................................... 318/568; 901/33; 901/38; 364/513
[58] Field of Search ....................... 901/24, 38, 34, 33, 901/46; 318/568; 364/513

[56] References Cited

U.S. PATENT DOCUMENTS

| | | | |
|---|---|---|---|
| 3,654,613 | 4/1972 | Dunne et al. | 340/172.5 |
| 3,951,271 | 4/1976 | Mette | 214/1 CM |
| 3,958,740 | 5/1976 | Dixon | 901/24 |
| 4,187,051 | 2/1980 | Kirsch | 901/24 |
| 4,274,802 | 6/1981 | Inaba et al. | 414/783 |
| 4,352,620 | 10/1982 | Inaba et al. | 414/225 |
| 4,411,575 | 10/1983 | Miller | 414/217 |
| 4,419,041 | 12/1983 | Rose | 414/739 |
| 4,424,473 | 1/1984 | Gorman | 901/24 X |
| 4,425,810 | 1/1984 | Simon et al. | 73/863.11 |
| 4,483,654 | 11/1984 | Koch et al. | 414/744 |
| 4,488,241 | 12/1984 | Hutchins et al. | 364/513 |
| 4,505,166 | 3/1985 | Tesar | 74/479 |
| 4,507,044 | 3/1985 | Hutchins et al. | 414/744 |
| 4,509,783 | 4/1985 | Ionescu | 294/88 |
| 4,510,684 | 4/1985 | Hutchins et al. | 29/703 |
| 4,532,816 | 8/1985 | Miller | 73/864.91 |
| 4,537,072 | 8/1985 | Fohler | 73/432 |
| 4,538,068 | 8/1985 | Haney et al. | 250/443.1 |
| 4,543,838 | 10/1985 | Fohler | 73/864.31 |
| 4,613,803 | 9/1986 | Hasegawa et al. | 318/568 |
| 4,621,331 | 11/1986 | Iwata | 901/38 |
| 4,633,414 | 12/1986 | Yabe et al. | 318/586 |
| 4,680,523 | 7/1987 | Goumas et al. | 318/685 |

FOREIGN PATENT DOCUMENTS 0117006 8/1984 European Pat. Off. .

Primary Examiner—Benjamin Dobeck
Attorney, Agent, or Firm—Hilmar L. Fricke

[57] ABSTRACT

An apparatus for handling and moving a plurality of objects such as containers each holding a sample to be analyzed by an analytical instrument contains the following:

a. a robotic arm assembly capable of vertical, horizontal and rotational movement;
b. gripper mechanism for holding objects attach to the arm of the assembly;
c. stepper motors for driving the robotic arm assembly;
d. a power source that drives the stepper motors electrically coupled to the motors;
e. a sensing system with a feedback loop that monitors the movement of arm assembly, the objects being manipulated by the arm assembly and the force applied to the objects by the gripper mechanism;
f. a computer electrically interfaced with the linear stepper motors, the power means and the sensing system with the feedback loop and
g. a means for providing operating data input to the computer;

operating data is provided to the computer for operation of the autosampler and the autosampler moves the object as directed.

6 Claims, 5 Drawing Sheets

AUTOSAMPLER

BACKGROUND OF THE INVENTION

This invention is related an automatic sampling device and in particular to a device that automatically loads and unloads samples from laboratory analyzing equipment.

A differential scanning calorimeter (DSC) is widely used for thermoanalytical analysis. The DSC is used for research and quality control and measures both the temperature and heats associated with various transitions in materials such as boiling points and melting points, liquid crystal transitions, heats of reaction, specific heat capacity, oxidative and thermal stability, purity, polymer cure, glass transition and reaction kinetics. Performing specific experiments with the DSC is time consuming and repetitive for an operator. Typical thermal analysis equipment is shown in Harden et al U.S. Pat. No. 3,283,560 issued Nov. 8, 1966 and in Johnson U.S. Pat. No. 4,350,446 issued Sept. 21, 1982. There is a need for a device that will automatically load and unload a series of samples from equipment such as a DSC and allow for the unattended operation of such equipment.

The prior art shows automated devices that can be used for repetitive operations such as Inaba et al U.S. Pat. No. 4,274,802 issued June 23, 1981, Hutchins et al U.S. Pat. No. 4,488,241 issued Dec. 11, 1984 Hutchins et al. U.S. Pat. No. 4,510,684 issued Apr. 16, 1985 and Hutchins et al U.S. Pat. No. 4,507,684 issued Mar. 26, 1985. However, for a device to be useful, it must be programmable with equipment such as the DSC, be able to load a sample for analysis, allow the DSC to perform any of its preprogrammed analytical tasks, then unload the sample and must be able to perform the above tasks repetitively. Also, special gripper devices are required to handle the sample containers and reference containers and covers used. One prior art gripper device is shown Ionescu U.S. Pat. No. 4,509,783 issued Apr. 9, 1985 but cannot be controlled at the accuracy required to handle sample and reference containers. Many other prior art devices use vacuum for holding samples which is not workable for covered and uncovered sample containers used with analytical equipment such as a DSC or dual cell DSC.

The autosampler of this invention provides robotic means for automated and computer programmed loading and unloading of a plurality of samples to and from equipment such as a DSC to allow for automated and unattended analysis of these samples.

SUMMARY OF THE INVENTION

An apparatus for handling a plurality of objects, such as containers each holding a sample to be analyzed by an analytical instrument, and moves the object according to a programmed procedure, for example, from a first position in a holder to a second position in an analytical instrument and then returns the object to the first position in the holder; wherein the apparatus contains the following:

a. a robotic arm assembly capable of vertical, horizontal and rotational movement;
b. gripper mechanism for holding objects attached to the arm of the assembly;
c. stepper motors for driving the robotic arm assembly;
d. a power source that drives the stepper motors electrically coupled to the motors;
e. a sensing system with a feedback loop that monitors the movement of arm assembly, the objects being manipulated by the arm assembly, and the force applied to the objects by the gripper mechanism;
f. a computer electrically interfaced with the linear and/or rotational stepper motors, the power means and the sensing system with the feedback loop and
g. a means for providing operating data input to the computer;

wherein operating data is provided to the computer for operation of the autosampler and the autosampler moves an object according to the data provided: whereby the robotic arm assembly with its gripper mechanism that picks up the object is being driven by the stepper motors coupled to a power source and the movement of the arm assembly and the object and the force applied by the gripper mechanism to the object is monitored by the sensing system which feeds back information to the computer that controls and corrects movements of the arm assembly and the force applied by the gripper mechanism.

DETAILED DESCRIPTION OF THE INVENTION

Figure 1:
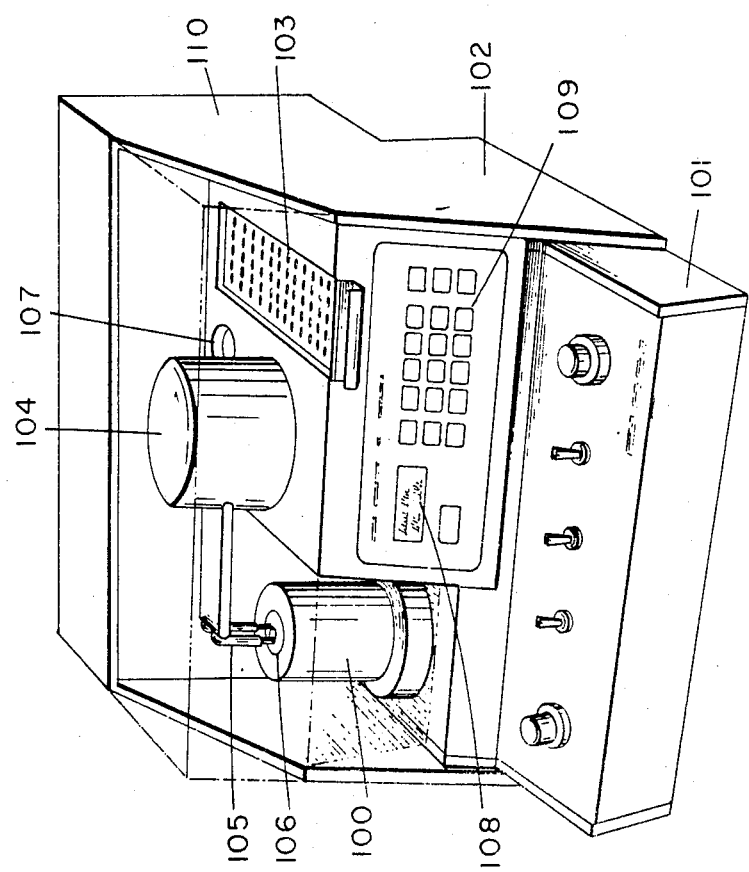
FIG. 1 is a perspective view of the autosampler in conjunction with a DSC analytical unit.

The autosampler will automatically load and unload containers with or without samples from an analytical instrument. Empty containers are used as a reference. The autosampler is particularly designed to be used with a differential scanning calorimeter (DSC) or dual cell differential scanning calorimeter (DSDSC). Operating data can be provided to the computer of the autosampler by an operator through a keyboard with a display means or the computer of the autosampler can be driven by a computer program provided by another computer, i.e. a Du Pont 9900 Thermal Analysis Controller. The autosampler can select and load and unload up to 62 containers with samples or reference containers from a sample tray or holder to the cell of the analytical instrument. Also, mixed sample containers can be loaded or unloaded with the autosampler including standard containers, crimped containers, hermetically sealed containers, and open containers.

Once the autosampler is programmed and loaded with containers containing samples to be analyzed, it operates without further human operator assistance. The autosampler has the ability with the Du Pont 9900 Thermal Analysis Controller, if properly programmed, to abort an experiment if problems occur with the transfer of sample containers and then continue with further sample transfers and experiments without operator assistance.

The autosampler is designed to work with DSC equipment such as a Du Pont 9900 Thermal Analysis Controller, 9900 Module Interface and either a 910 DSC cell or a 912 DSDSC cell. The Controller contains the software programming that allows an operator to select the sample(s) and reference(s) used for the analysis and the thermal method that is to be used for the analysis. Up to fifteen methods of analysis can be selected for different samples being analyzed. After the operator has selected the method of analysis that is to be used and has determined the sequence the samples are to be analyzed in, and has fed this data to the Controller via the keyboard of the 9900 Controller, the Controller with the autosampler will carry out the analysis once the samples have been loaded. Data obtained from the analysis can be permanently stored in the Controller or printed out for immediate use. Communications between the autosampler and the Controller is over a common data communications cable.

The samples to be analyzed are each placed in a container and the containers are positioned on a removable tray on the autosampler. The containers need not be all of the same type but a mixture of any of the aforementioned containers can be used. The tray provides an accurate presentation of multiple sample containers and/or reference containers and is labeled for sample identification by using a rectangular coordinate system of container location on the tray to maximize density of containers on the tray. The coordinates of container location are fed to the autosampler to facilitate pick up of the containers by the grippers of the robotic arm. The tray design is such that the gripper pick up of the autosampler can hold a container at any angle in reference to the center of the tray.

The gripper mechanism, which preferably is a mechanical finger system, is attached to the robotic arm assembly to pick up containers and duplicates the tweezers commonly used by human operators to move containers containing samples. The finger system can handle other objects such as covers for the DSC cell and DSDCS cells.

An integral part of the mechanical finger system is a sensing system that continuously monitors any objects being handled. The sensing system provides constant feed back for presence of the sample and/or reference containers and unintentional contact of the fingers with the cell. The sensing system prevents further finger or arm motion on contact with the cell that would damage the cell. The sensing system also controls the amount of force the fingers apply to the containers to prevent the containers from being crushed or damaged. Heavier objects that require additional force by the fingers to handle and move them is also controlled by the sensing system. In the event the system senses that an analysis can not be done because of a problem with the transfer of a sample, the analysis of that sample will be aborted and the next sample will be analyzed.

A separate sensing system for the position of the arm assembly utilizes optical sensors in conjunction with software for monitoring the vertical, horizontal and rotational position of the arm assembly. A signal is fed back to the computer which in turn controls electrical stepping motors that drive the arm assembly and fingers through a series of gear drives. This mechanical drive system removes the inaccuracies of cable or pneumatic/hydraulic systems. The use of electric motors and electronic and optical sensors doesn't have dust, dirt and oil and other contamination associated therewith as do the cable or pneumatic/hydraulic systems which can adversely affect sensitive thermal measurements.

The autosampler provides a method of mechanical position calibration whereby the fingers and the arm assembly under operator control are commanded to move to a desired location through the use of the keyboard of the autosampler. Once the location is established, it is stored in the memory of the computer of the autosampler for future use. This permits the autosampler to be used with similar but not identical DSC cells without the need of special calibration tools or accessories.

Optionally, the autosampler can control an air source for the DSC cell for purposes of cooling or warming the cell to a desired temperature before loading or unloading a sample/reference container. For rapid cooling and for operation at sub ambient temperatures, liquid nitrogen can be used. Provision can also be made through a time delay function to continue to apply air to the cell after the cell reaches a specified loading/unloading temperature.

FIG. 1 shows a perspective view of the autosampler in conjunction with a DSC analytical unit. The autosampler has a cabinet 102 which provides a cavity to hold the DSC cell 100 and DSC cell base 101 shown with three control knobs and two switches and provides a compartment 110 for mounting electronics, wiring and the like for control and operation of the autosampler rotatable arm assembly 104 having mechanical finger attachments 105 for gripping a sample. Also, as part of the cabinet is a location 107 for storing the DSC cell lid(s) and cover(s) 106, a receptacle for the removable sample/reference tray 103 and an integral keyboard 109 and display 108 connected to the computer for the operator to interface with the autosampler.

From a host computer (Du Pont 9900 Thermal Analysis Controller) coupled to the autosampler via an interface cable, or through the keyboard 109, commands can be given to the autosampler to move sample/reference containers between the DSC cell 100 and the storage tray 103. Commands can also be given to move DSC lids from their storage locations to and from the DSC cell. Additional functions are provided to the autosampler via the keyboard for calibration of various positions such as where sample/reference containers and DSC cell lid(s) and cover(s) are located. Also, the keyboard provides access to numerous self testing procedures and exercises that can be executed by the computer of the autosampler.

Figure 2:
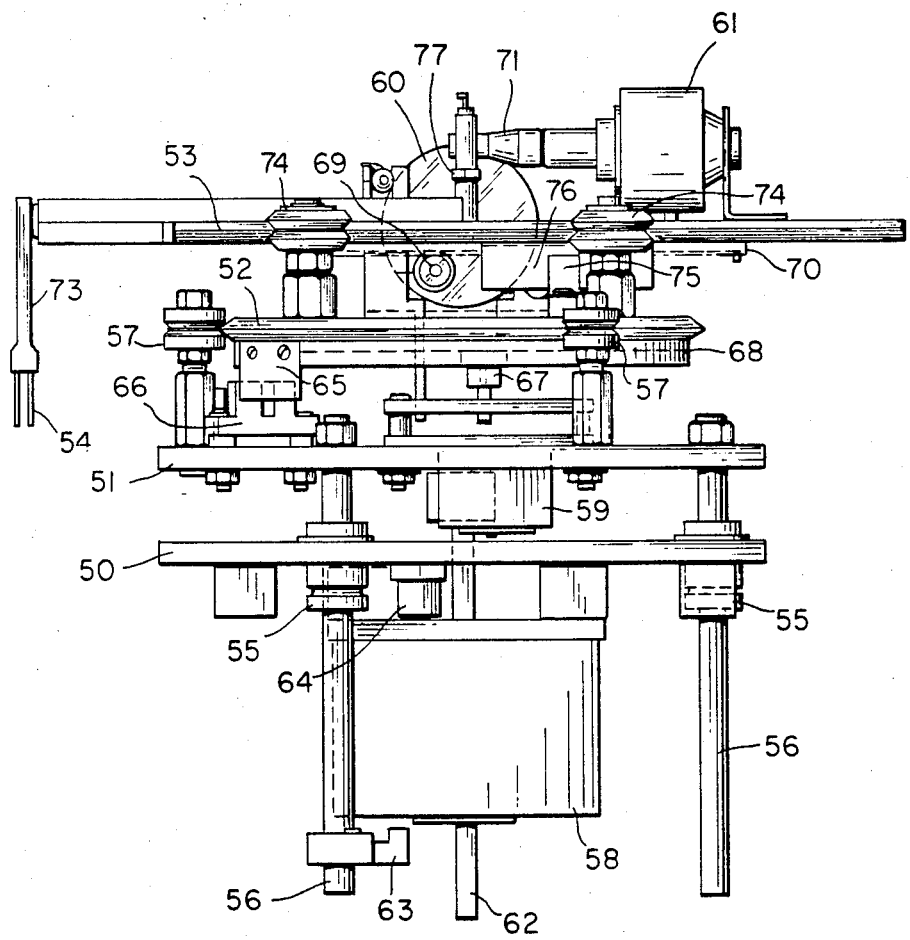
FIG. 2 is an elevation view of the rotatable robotic arm assembly.

FIG. 2 is an elevation view of the rotatable robotic arm assembly, also referred to as the turret assembly. The assembly consists of three metal plates; a fixed plate 50 which mounts the turret assembly to the autosampler frame, a second moveable plate 51 which moves in an axial direction with respect to the fixed plate 50, and the third, rotatable plate 52, moves in rotational direction with respect to the second plate 51. Guide rods 56 attached to moveable plate 51 positioned in linear bearings 55 control the vertical movement of plate 51. A stepping motor 58 designed to operate as a linear actuator has a threaded shaft 62 mechanically engaged which is used to position movable plate 51 in an axial direction with respect to fixed plate 50. A flag 63 and sensor 64 are used to determine the position of movable plate 51 with respect to fixed plate 50.

Attached to movable plate 51, are a series of "V" grooved rollers 57 which both support and guide the rotational plate 52. A second stepper motor 59 rotates plate 52 in rollers 57 through a gear drive 67 which is operated through a ring gear 68 attached to plate 52. Positional information on plate 52 is provided through optical sensors 66 and flag 65. The positional information is fed to the computer of the autosampler.

The robotic arm 53 has a sliding bar which is supported and guided by additional "V" grooved rollers 74 attached to rotational plate 52. A third stepper motor 60 working through a gear drive pinion 69 moves gear rack 70 attached to the sliding bar of the robotic arm which causes the sliding bar to move in the rollers 74. The location of the sliding bar is sensed through flag 76 and optical sensor 75 with respect to the rotational plate 52.

Mounted at the end of the robotic arm 53 are two "Z" formed wire rod assemblies 73. Inserted in the end of each wire rod is one or more spring wires which form the finger 54 for gripping containers containing samples and lids. The fingers may be of any electrically conductive material and formed as necessary for the gripping of containers and lid(s) and other objects that may be handled. The finger may be grooved, roughed coated and the like. A nonconductive rubber "O" ring or a spring 77 is used to pull the end of the wire rods 73 together against cone 71 thereby keeping the gripper fingers 54 spread a distance determined by the diameter of the cone 71.

A fourth stepper motor 61 is used as a linear actuator to move cone 71 in between wire rods 73. As the cone 71 moves to spread the wire rods held to the cone's surface by "O" ring 77, the resulting action is that the rods 73 and the fingers 54 move closer together to grasp any object positioned between the fingers. As the cone 71 is removed from the two wire rods 73, the rods 73 and the fingers 54 return to their open position. The amount of gripping force is controlled by the force exerted by the cone as the motor drives the cone between the two wire rods.

All operations of the autosampler are controlled by a computer. Typically, a microprocessor is used.

Figure 3:
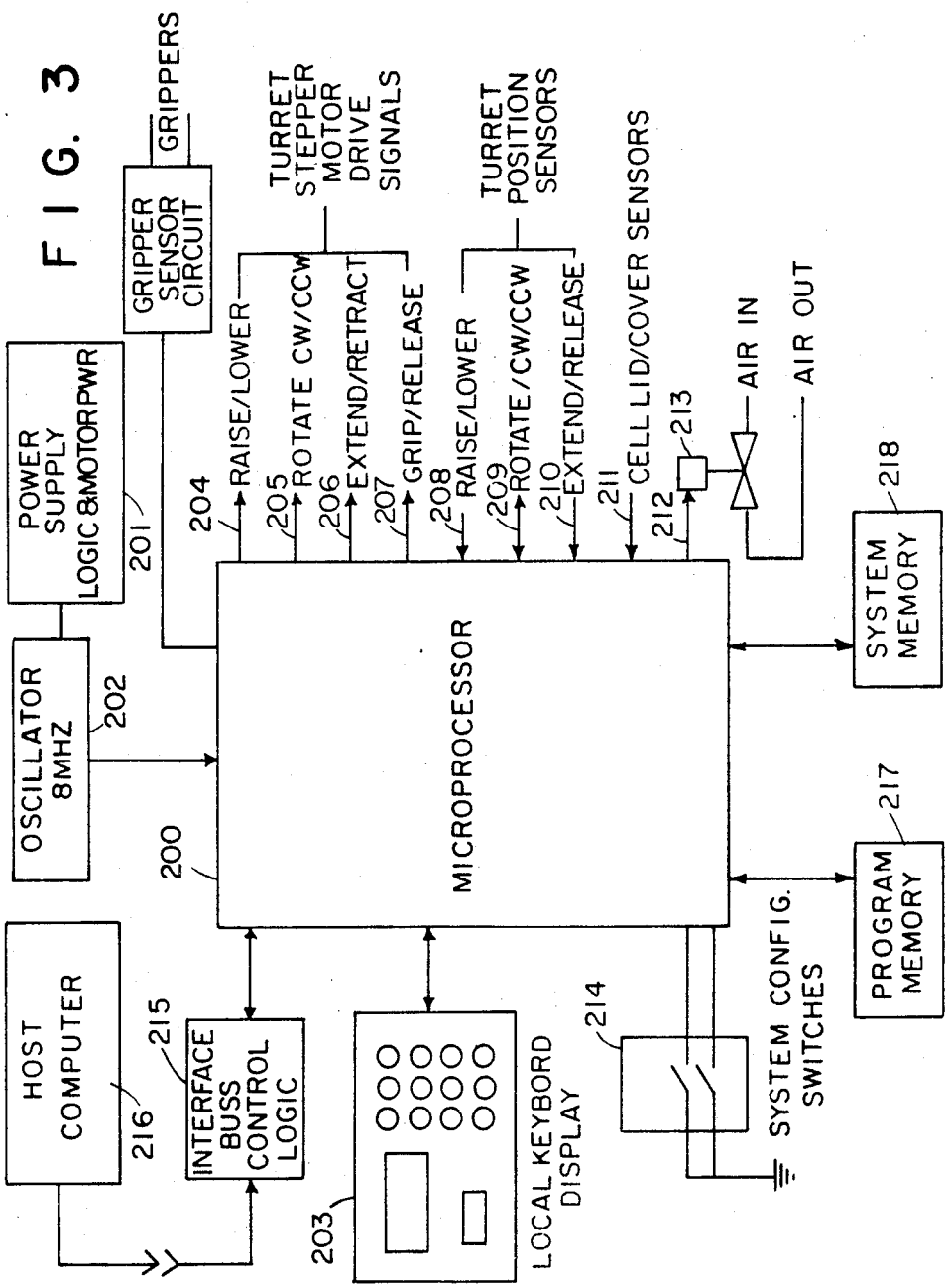
FIG. 3 is a schematic diagram of a microprocessor and related components controlled by the microprocessor.

FIG. 3 is a schematic diagram showing a microprocessor and related components controlled by the microprocessor. Any of the conventional microprocessors can be used such as an Intel 8085, 80186, Motorola 6809, and the like. The microprocessor 200 reads and executes instructions from the program memory 217. These instructions from the program memory make it possible for the microprocessor to interpret commands from the keyboard 203, the state of the various sensors 208–211 and similar input conditions and to control the steppers motors 204–207 and similar output devices. An oscillator 202 provides clock signals for the microprocessor. Power supply 201 provides voltages and currents necessary to operate the microprocessor and related electronic equipment. The autosampler can be operated under fully automatic conditions by having a host computer 216 through an interface buss and control logic circuit 215 feed commands to the microprocessor and thereby control the operations of the autosampler.

The microprocessor controls the following stepper motor drive signals:

204—stepper motor drive signals to raise and lower plate 51 (FIG. 2);
205—stepper motor drive signals to rotate plate 52;
206—stepper motor drive signals to extend and retract slide bar 53;
207—stepper motor drive signals to grip and release finger 54

The following signals are fed to the microprocessor for the positioning of components of the arm assembly
208—raise/lower signal from sensor 64;
209—rotate clockwise or counter clockwise signal from sensor 66;
210—extend release signal from sensor 75;
211—cell lid/cover sensor and sample tray sensor signal from switches which sense when lids are stored 107 and sample tray is in place.

The microprocessor controls air for cooling or preheating the cell via a signal 212 which controls the solenoid 213 which controls the air to the cell 100.

Switches 214 allow the operator to select the type of cell to be used, i.e., single or dual cell, turns off audible alarm and selects other operating options.

The power supply 201 provides power to the oscillator 202, typically 8 MHZ oscillator, the solenoid 213, the system memory 218, the microprocessor 200, the program memory 217, the switches 214, the keyboard display 203 and the interface buss 215.

Figure 4:
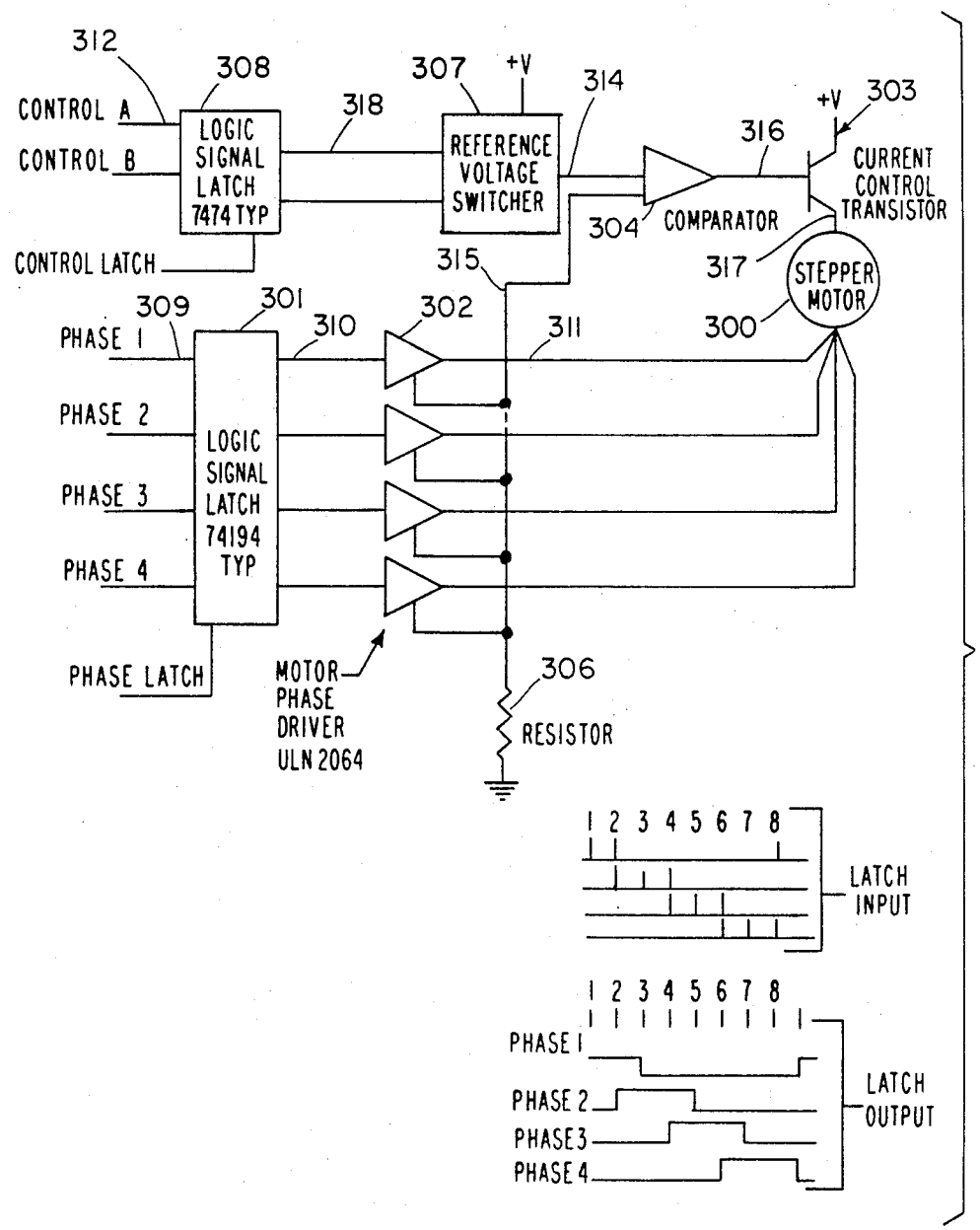
FIG. 4 is a circuit diagram of the stepper motor circuit.

A group of signals is generated by the microprocessor 200 for each of the four almost identical stepper motor drive circuits 204–207. One typical stepper motor circuit is shown in FIG. 4. The circuit includes logic latches 301&308, comparator 304 selectable comparator reference voltages 307, a stepper motor current control transistor 303 and the stepper motor 300.

The microprocessor generates signals or pulses indicated as 309, FIG. 4, which are latched in logic signal latch TYP 74194 to provide continuous signals 310. These signals are fed to phase driver integrated circuits 302 which converts the logic level signals to equivalent high current signals 311 that are then fed to the various stepper motor phase windings and are capable of switching the current of the windings. The pattern and rate of the pulses 311 generated by the microprocessor switch the various stepping motor phases on and off in such a manner to operate the shaft of the stepping motor at a desired rate in either a rotational direction or linear direction.

Included as part of the stepper motor drive circuit is a control of the amount of current supplied to the motor. This allows the motor to generate the forces needed to perform the desired functions which may be more or less than the motor's rated specifications. Stepper motors become "free wheeling" whenever power is totally removed but this circuit permits the motor to be energized with a minimum amount of power during idle periods to prevent slippage from occurring. This circuit reduces instrument power consumption and increases the life of the motor.

The current level of the stepper motor is set by the microprocessor via two control lines A and B 312. This setting is latched by 308 which is logic signal latch 7474 TYP and transferred to a network which provides a predetermined reference voltage 314 based on the ON-/OFF configuration of the signal lines to the network 318. This reference voltage is used by the comparator 304. The function of the comparator is to compare the reference voltage 314 to a voltage which represents the amount of current flowing to the motor 300 and either increase or decrease the motor current according to the reference setting. The reference voltage 314 is generated by the reference voltage switcher 307 which consists of a pair of 7406 gates and a resistor network. A signal 316 is generated by the comparator 304 which sets the desired current to the motor. This signal 316 drives a current control transistor 303 which directly controls the current flowing to the motor. The voltage signal 315 which indicates the amount of current flowing to the motor is generated by passing the motor current through a resistor 306. By Ohm's Law the current passing through the resistor generates a proportional voltage which is used by the comparator to set the motor current with respect to the comparator reference voltage. Current from the power supply 201, FIG. 3, is passed through transistor 303, the stepper motor 300 the respective motor phase drivers 302, which are typically motor phase driver ULN2064, and resistor 306 before being returned to the power supply through the system ground connections. The latch input 309 and latch output 310 illustrate a signal sequence for supplying current to the 4 phases of the stepper motor 300.

The accuracy of the robotic arm assembly is achieved through the use of software for the microprocessor and by the optical sensing system with its feed back loop. The software is configured such that upon power up of the autosampler each axis of motion of the turret is driven by the appropriate stepper motor to a "home" position (a flag enters the optical sensor for that particular motion axis). Once in the home position a set of internal counters (one counter for each motion axis) is set to zero or any other predetermined reference number. When it is necessary to move the assembly in a particular motion axis a series of pulses similar to (309) is generated by the microprocessor. The counter associated with the motion axis being moved is incremented/-decremented according to the direction of motion for the number of pulses issued. When the sensor is activated, the counter should be zero or at a reference number, if not, an error has occurred. The amount of error is calculated by the microprocessor and a correction is made. Optimum placement of the optical sensors insure that errors in positioning are minimized. Flags for each sensor which continuously activate the sensor for part of the full motion of axis travel but do not activate the sensor for the remaining part of the axis travel indicate relative direction to the microprocessor. This arrangement of sensors, stepper motors and software permit accurate, repeatable, positioning of the assembly without need to implement more costly positional sensing means such as incremental encoders, absolute encoders, mechanical switches, or other arrangements of servo-controlled motors.

Figure 5:
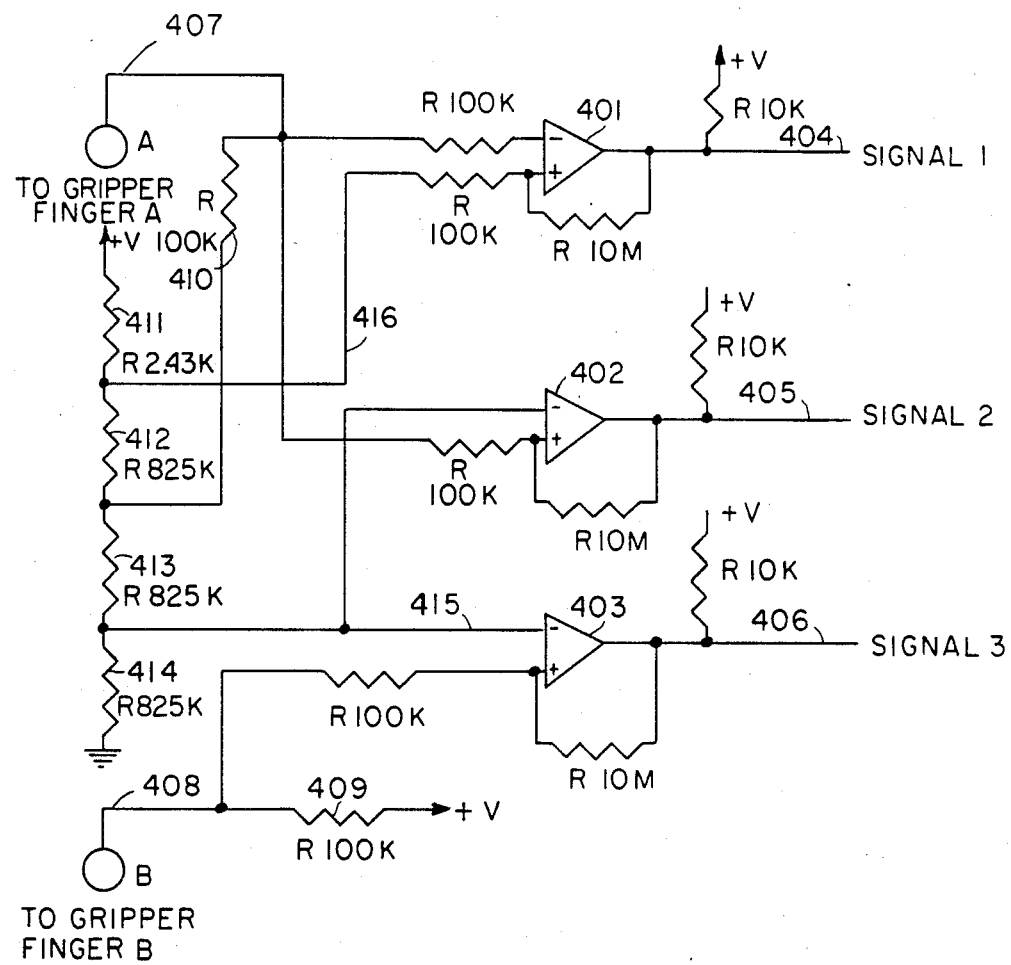
FIG. 5 is a circuit diagram for the gripper finger circuit.

FIG. 5 shows the gripper finger sensor circuit. The circuit is based on the measurement of various voltage levels of the gripper fingers. In addition to the use of voltage measurements as the basis for the functioning of this sensor method other similar techniques can be employed including current measurement, capacitance measurement, frequency measurement, inductance measurement, and resonance measurement. All of these methods have the advantage of reduced parts and complexity over more standard sensing methods using switches, optical sensors, or similar electromechanical devices.

In the circuit three comparators, 401–403, typically LM339 are used to generate signals indicating that either gripper finger has touched the DSC cell(405 and 406) or that the gripper fingers are holding an object (404). A pair of conductors (407, 408) is attached to the gripper fingers which are electrically isolated from the turret assembly. Each conductor (finger) is normally energized to somewhat different voltages thru one or more resistors connected to the supply voltage (409 for finger B and 410–412 for finger A).

Detection of when either finger (or both) touches the cell (which is at circuit ground potential) is accomplished for each finger by a dedicated comparator (402 for finger A and 403 for finger B). Both finger detection circuits work the same and only one will be described. The comparator 403 is referenced thru its inverting input 415 to a potential above ground thru a network of resistors 411–414. The gripper finger is connected to the non-inverting input of the comparator 408 and held at a potential close to the circuit supply voltage thru a resistor 409. The comparator produces a voltage signal indicating this state (gripper finger not touching the DSC cell). When the gripper finger touches the cell, which is at ground potential, the comparator senses that its non-inverting input is at a lower potential than the reference voltage present on its inverting input and switches the state of its output signal 406. This change in signal is monitored by the microprocessor and used to halt motion of the fingers in the cell.

The finger circuitry sensing whenever an object is gripped works in a similar fashion. A reference voltage 416 (higher than that used for the fingers touching cell sensors) is applied to a comparator's 401 non-inverting input. A slightly lower voltage is applied to both the gripper finger (A) and the comparator's 401 inverting input. Both of these voltages are generated thru a string of resistors 411 thru 414.

As long as the voltage on the fingers remains less than the voltage on the comparator's non-inverting input, the comparator indicates this state with a voltage signal 404. When an object is gripped between the fingers (all objects gripped for DSC use are electrically conductive materials) the two gripper fingers are effectively shorted together. Since the voltage present on the B finger 407 is higher than that of the A finger 408, the potential of the A finger is raised to the same level as the B finger. This changes the potential of the inverting terminal of the comparator 401 to a level higher than that applied to its non-inverting input. The comparator changes state to indicate this condition. This signal change is used by the microprocessor to monitor objects picked up by the grippers.

This circuit is unique in that it not only can indicate the presence of an object, but this signal when combined with knowledge of the object being picked up can be used by the microprocessor to determine the amount of force exerted to hold an object without applying excessive force to crush or otherwise damage the gripped object.

We claim:

1. An apparatus for handling and moving a plurality of objects; wherein the apparatus comprising:
   a. a robotic arm assembly capable of vertical, horizontal and rotational movement;
   b. gripper mechanism for holding objects attach to the arm of the assembly; said gripper mechanism having gripper fingers attached thereto actuated by a cone;
   c. stepper motors for driving the robotic arm assembly, wherein one stepper motor drives the cone thereby simultaneously opening and closing the gripper fingers of the gripper mechanism;
   d. a power source that drives the stepper motors electrically coupled to the stepper motors;
   e. a first sensing system with a feedback loop that monitors the movement of the arm assembly;

f. a second sensing system for the gripper that controls the amount of force applied to the object being moved, senses the presence of the object in the gripper and sense the presence of surrounding objects and prevents contact with such objects and thereby prevents damage to the gripper and surrounding objects;

g. a computer electrically interfaced with the stepper motors, the power means and the first and second sensing systems with the feedback loop and receives operating data for the operation of the apparatus and movement of objects and feed back information from the first and second sensing systems and controls and corrects movements of the arm assembly and the force applied by the gripper mechanism by controlling the stepper motors that operates the gripper mechanism;

h. means for providing operating data input to the computer.

2. The apparatus of claim 1 in which the means for providing operating data to the computer comprises an input port to which is connected a second computer that provides a programmed input to the computer of the apparatus.

3. The apparatus of claim 1 in which the gripper mechanism comprises a system of fingers capable of holding objects of various different shapes.

4. The apparatus of claim 3 in which the robotic arm assembly comprises a vertical drive component, a horizontal drive component and a rotational drive component that are individually driven by separate stepper motors.

5. The apparatus of claim 4 in which the sensing system comprises optical sensors that are interfaced with the computer.

6. The apparatus of claim 5 in which the first sensing system continuously monitors the position of the objects being handled and the force being applied to the objects by the gripper mechanism of the apparatus and feeds this information back to the computer through the feed back loop and controls the stepper motor operating the gripper mechanism, and the second sensing system that monitors the position of the vertical, horizontal and rotational components of the arm assembly and feeds this information through the feed back loop to the computer which controls the stepper motors driving the components of the arm assembly.

* * * * *